(12) United States Patent
Ahn et al.

(10) Patent No.: US 11,812,033 B2
(45) Date of Patent: Nov. 7, 2023

(54) IMAGE ENCODING METHOD/DEVICE, IMAGE DECODING METHOD/DEVICE, AND RECORDING MEDIUM IN WHICH BITSTREAM IS STORED

(71) Applicant: Intellectual Discovery Co., Ltd., Seoul (KR)

(72) Inventors: Yong Jo Ahn, Seoul (KR); Ho Chan Ryu, Seoul (KR)

(73) Assignee: Intellectual Discovery Co., Ltd., Seoul (KR)

(*) Notice: Subject to any disclaimer, the term of this patent is extended or adjusted under 35 U.S.C. 154(b) by 0 days.

(21) Appl. No.: 17/471,467

(22) Filed: Sep. 10, 2021

(65) Prior Publication Data

US 2021/0409728 A1 Dec. 30, 2021

Related U.S. Application Data

(63) Continuation of application No. 16/968,942, filed as application No. PCT/KR2019/002149 on Feb. 21, 2019, now Pat. No. 11,153,574.

(30) Foreign Application Priority Data

Feb. 23, 2018 (KR) ........................ 10-2018-0021816

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/105* (2014.11); *H04N 19/139* (2014.11); *H04N 19/176* (2014.11)

(58) Field of Classification Search
CPC ..................................................... H04N 19/00
See application file for complete search history.

(56) References Cited

U.S. PATENT DOCUMENTS

| 10,531,084 B2 | 1/2020 | Yoo et al. |
| 2011/0182523 A1 | 7/2011 | Kim et al. |

(Continued)

FOREIGN PATENT DOCUMENTS

| KR | 10-2018-0001478 A | 1/2018 |
| KR | 10-2018-0008797 A | 1/2018 |

(Continued)

OTHER PUBLICATIONS

International Search Report for PCT/KR2019/002149 dated Jun. 5, 2019 [PCT/ISA/210].

(Continued)

*Primary Examiner* — Maryam A Nasri
(74) *Attorney, Agent, or Firm* — Sughrue Mion, PLLC

(57) ABSTRACT

The present invention provides an image encoding method and an image decoding method. The image decoding method of the present invention may comprise: obtaining intra-frame prediction information of a current block from a bitstream; inducing an intra-frame prediction mode of the current block on the basis of the intra-frame prediction information; determining a reference region for intra-frame prediction of the current block; and performing intra-frame prediction of the current block on the basis of the intra-frame prediction mode and the reference region.

7 Claims, 7 Drawing Sheets

(51) Int. Cl.
  *H04N 19/105* (2014.01)
  *H04N 19/139* (2014.01)
  *H04N 19/176* (2014.01)

(56) References Cited

U.S. PATENT DOCUMENTS

| | | |
|---|---|---|
| 2014/0321543 A1 | 10/2014 | Kim et al. |
| 2017/0353730 A1 | 12/2017 | Liu et al. |
| 2018/0184082 A1 | 6/2018 | Yoo et al. |
| 2019/0141319 A1* | 5/2019 | Moon ................ H04N 19/159 |
| 2019/0182481 A1 | 6/2019 | Lee |
| 2019/0222837 A1 | 7/2019 | Lee et al. |
| 2019/0313116 A1 | 10/2019 | Lee |

FOREIGN PATENT DOCUMENTS

| | | |
|---|---|---|
| KR | 10-2018-0009318 A | 1/2018 |
| KR | 10-2018-0011285 A | 1/2018 |
| WO | 2017/188780 A2 | 11/2017 |
| WO | 2017/209793 A1 | 12/2017 |
| WO | 2018/016823 A1 | 1/2018 |
| WO | 2018/026219 A1 | 2/2018 |

OTHER PUBLICATIONS

Extended European Search Report dated Jul. 2, 2021 from the European Patent Office in Application No. 19758000.4.
Vadim Seregin et al., "Block shape dependent intra mode coding", Joint Video Exploration Team (JVET) of ITU-T SG 16 WP 3 and ISO/IEC JTC 1/SC 29 WG 11, JVET-D0114, 4th Meeting: Chengdue, CN, Oct. 15-21, 2016, pp. 1-3 (3 pages total).
Chinese Office Action dated Mar. 15, 2023 in Chinese Application No. 201980014462.X.
Notice of Allowance dated Aug. 28, 2023 in corresponding Chinese Patent Application No. 201980014462.X.

* cited by examiner

MODE(L) ⇒ MODE(A) ⇒ MODE(PLANAR) ⇒ MODE(DC)
⇒ MODE(BL) ⇒ MODE(AR) ⇒ MODE(AL)
⇒ MODE(ANG)-1 ⇒ MODE(ANG)+1
⇒ MODE(VER) ⇒ MODE(HOR)
⇒ MODE(BL_DIA) ⇒ MODE(AR_DIA)

IMAGE ENCODING METHOD/DEVICE, IMAGE DECODING METHOD/DEVICE, AND RECORDING MEDIUM IN WHICH BITSTREAM IS STORED

CROSS-REFERENCE TO RELATED APPLICATION(S)

This is a continuation of U.S. application Ser. No. 16/968,942 filed Aug. 11, 2020, which is National Stage of International Application No. PCT/KR2019/002149 filed Feb. 21, 2019, claiming priority based on Korean Patent Application No. 10-2018-0021816 filed Feb. 23, 2018.

TECHNICAL FIELD

The present invention relates to an image encoding/decoding method and apparatus. More specifically, it relates to an image encoding/decoding method and apparatus for performing intra prediction.

BACKGROUND ART

The market demands for high resolution video is increasing, and accordingly, a technology capable of efficiently compressing high resolution video is required. According to these market demands, ISO/IEC's Moving Picture Expert Group (MPEG) and ITU-T's Video Coding Expert Group (VCEG) jointly formed JCT-VC (Joint Collaborative Team on Video Coding), completed the development of the HEVC (High Efficiency Video Coding) video compression standard in January 2013, and has been actively researching and developing next-generation compression standards.

Video compression is largely composed of intra prediction, inter prediction, transform, quantization, entropy coding, and in-loop filter. Among them, intra prediction refers to a technique for generating a prediction block of a current block using reconstructed pixels existing around the current block. The encoder encodes an intra prediction mode used for intra prediction, and the decoder restores the encoded intra prediction mode to perform intra prediction.

DISCLOSURE

Technical Problem

An object of the present invention is to provide an image encoding/decoding method and apparatus with improved efficiency.

In addition, an object of the present invention is to provide an image encoding/decoding method and apparatus for performing intra prediction with improved efficiency.

In addition, an object of the present invention is to provide an image encoding/decoding method and apparatus for efficiently encoding/decoding an intra prediction mode.

In addition, an object of the present invention is to provide a computer readable recording medium storing a bitstream generated by the video encoding method/apparatus according to the present invention.

Technical Solution

In the video encoding/decoding method according to the present invention, intra prediction information of a current block may be obtained from a bitstream, and an intra prediction mode of the current block may be derived based on the intra prediction information. A reference area for intra prediction may be determined, and intra prediction of the current block may be performed based on the intra prediction mode and the reference area.

In the image encoding/decoding method according to the present invention, the step of deriving the intra prediction mode may generate an MPM list of the current block, and determine an intra prediction mode of the current block from the MPM list.

In the image encoding/decoding method according to the present invention, the MPM list may include 6 MPMs.

In the image encoding/decoding method according to the present invention, the MPM list may be generated based on at least one of an intra-prediction mode of a neighboring block, a location of a reference area of the current block, or split information of the current block.

In the image encoding/decoding method according to the present invention, the reference area may be a first reference line adjacent to at least one of the left or top of the current block or a second reference line adjacent to at least one of the left or top of the first reference line.

In the image encoding/decoding method according to the present invention, an available intra-prediction modes for the current block may include two non-directional modes and 65 directional modes.

In the image encoding/decoding method according to the present invention, when the width of the current block is greater than the height of the current block, the number of modes with horizontal directionality that are available for the current block is greater than the number of modes with vertical directionality.

In the image encoding/decoding method according to the present invention, when the width of the current block is less than the height of the current block, the number of modes with vertical directionality that are available for the current block is greater than the number of modes with horizontal directionality.

In the image encoding/decoding method according to the present invention, the modes with the horizontal directionality refer to modes located between mode 2 and mode 34, and the modes with the vertical directionality refer to modes located between mode 34 and mode 66.

Advantageous Effects

According to the present invention, an image encoding/decoding method and apparatus with improved efficiency may be provided.

Further, according to the present invention, an image encoding/decoding method and apparatus for performing intra prediction with improved efficiency may be provided.

Further, according to the present invention, an image encoding/decoding method and apparatus for efficiently encoding/decoding an intra prediction mode may be provided.

Further, according to the present invention, a computer readable recording medium storing a bitstream generated by the video encoding method/device according to the present invention may be provided.

BEST MODE

Figure 1:
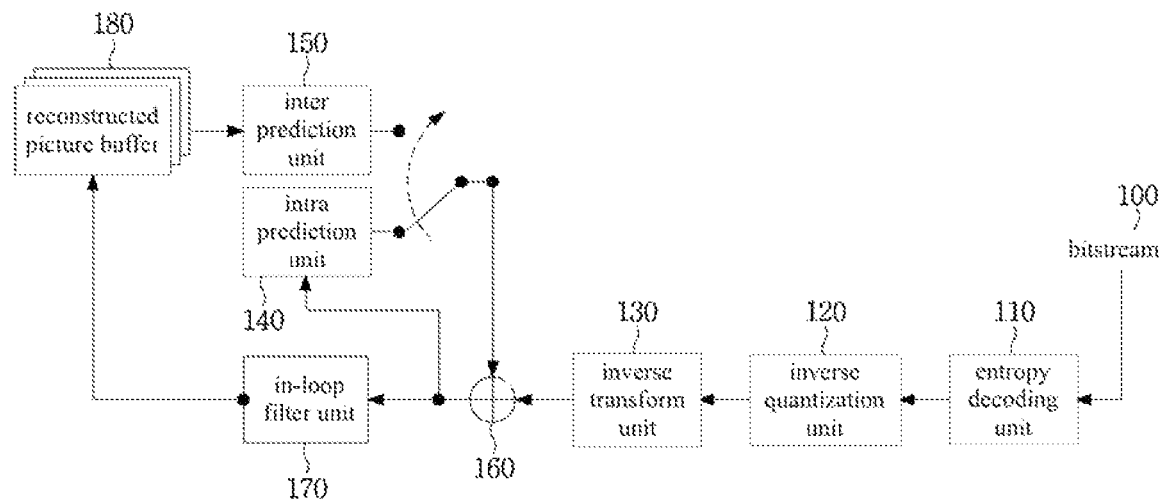
FIG. 1 is a diagram illustrating an image decoding apparatus according to an embodiment of the present invention.

In the video encoding/decoding method according to the present invention, intra prediction information of a current block may be obtained from a bitstream, and an intra prediction mode of the current block may be derived based on the intra prediction information. A reference area for intra prediction may be determined, and intra prediction of the current block may be performed based on the intra prediction mode and the reference area.

In the image encoding/decoding method according to the present invention, the step of deriving the intra prediction mode may generate an MPM list of the current block, and determine an intra prediction mode of the current block from the MPM list.

In the image encoding/decoding method according to the present invention, the MPM list may include 6 MPMs.

In the image encoding/decoding method according to the present invention, the MPM list may be generated based on at least one of an intra-prediction mode of a neighboring block, a location of a reference area of the current block, or split information of the current block.

In the image encoding/decoding method according to the present invention, the reference area may be a first reference line adjacent to at least one of the left or top of the current block or a second reference line adjacent to at least one of the left or top of the first reference line.

In the image encoding/decoding method according to the present invention, an available intra-prediction modes for the current block may include two non-directional modes and 65 directional modes.

In the image encoding/decoding method according to the present invention, when the width of the current block is greater than the height of the current block, the number of modes with horizontal directionality that are available for the current block is greater than the number of modes with vertical directionality.

In the image encoding/decoding method according to the present invention, when the width of the current block is less than the height of the current block, the number of modes with vertical directionality that are available for the current block is greater than the number of modes with horizontal directionality.

In the image encoding/decoding method according to the present invention, the modes with the horizontal directionality refer to modes located between mode 2 and mode 34, and the modes with the vertical directionality refer to modes located between mode 34 and mode 66.

MODE FOR INVENTION

Hereinafter, embodiments of the present invention will be described in detail with reference to the drawings attached thereto, so that those skilled in the art may easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, the terms first, second, etc. may be used to describe various components, but the components should not be limited by the terms. The terms are used only for the purpose of distinguishing one component from another.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present invention may be added to the second embodiment of the present invention, or may replace some of the components or steps of the second embodiment.

In addition, the components shown in the embodiments of the present invention are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present invention without departing from the essence of the present invention.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, a apparatus included in a server terminal such as a TV application server and a service server, and may mean a user terminal such as various apparatus, a communication apparatus such as a communication modem for performing communication with a wired/wireless communication network, a memory for storing various programs and data for decoding an image or performing an inter prediction or intra prediction for decoding, various apparatus equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block' and 'a block'.

The present invention relates to a technique for encoding an intra prediction mode among image encoding techniques. Specifically, in performing intra prediction, it is possible to adaptively change (increase or decrease) the number of intra prediction modes using information of a target block.

Also, the intra prediction mode may be encoded/decoded using one or more different methods. The information of the target block may include a size, split depth, shape (non-square or square), component (luma or chroma) of the target block, and the like.

For example, according to the present invention, different number of intra prediction modes may be used according to a size of a target block for which intra prediction is performed. Also, a plurality of intra prediction mode encoding methods may be used to encode the different number of intra prediction modes.

Hereinafter, exemplary embodiments of the present invention will be described in detail with reference to the accompanying drawings. In describing the present invention, redundant description of the same components will be omitted.

FIG. 1 is a diagram illustrating an image decoding apparatus according to an embodiment of the present invention.

An image decoding apparatus according to an embodiment of the present invention may include at least one of an entropy decoding unit 110, an inverse quantization unit 120, an inverse transform unit 130, an intra prediction unit 140, an inter prediction unit 150, and an addition unit 160, an in-loop filter unit 170 and a reconstructed picture buffer 180.

The entropy decoding unit 110 may decode the input bitstream 100 and output decoding information such as syntax elements and quantized coefficients.

The inverse quantization unit 120 and the inverse transform unit 130 may receive a quantization coefficient to perform inverse quantization and/or inverse transform, and output a residual signal.

The intra prediction unit 140 may generate a prediction signal by performing spatial prediction using a pixel value of a pre-decoded neighboring block adjacent to the current block to be decoded. The reference pixel used for intra prediction may include a pre-decoded pixel included in a current picture.

The inter prediction unit 150 may generate a prediction signal by performing motion compensation using a motion vector extracted from a bitstream and a reconstructed image stored in the reconstructed picture buffer 180.

The prediction signal output from the intra prediction unit 140 and the inter prediction unit 150 is added to the residual signal through the addition unit 160, and accordingly, the reconstructed signal generated in units of blocks may include the reconstructed image.

The reconstructed image may be transmitted to the in-loop filter unit 170. The reconstructed picture to which filtering is applied may be stored in the reconstructed picture buffer 180. The reconstructed picture stored in the reconstructed picture buffer 180 may be used as a reference picture in the inter prediction unit 150.

Figure 2:
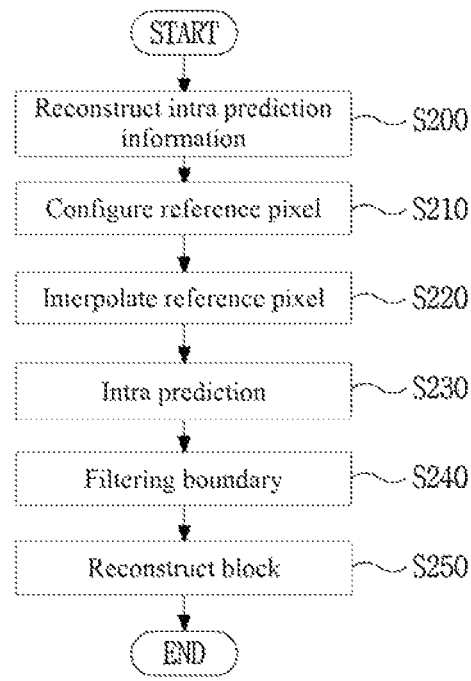
FIG. 2 is a diagram for explaining an intra prediction according to an embodiment of the present invention.

FIG. 2 is a diagram for explaining an intra prediction according to an embodiment of the present invention.

The intra prediction method described with reference to FIG. 2 may use different number of intra-prediction modes according to a block size, and accordingly, different intra prediction mode coding methods may be used.

Hereinafter, the intra prediction mode coding method may refer to a method of encoding the intra prediction mode in the encoder and the encoding method, and may refer to a method of decoding the intra prediction mode in the decoder and the decoding method.

The intra prediction information reconstruction unit may restore intra prediction information of a current decoding target block from a bitstream (S200). Here, the intra prediction information may be understood as a concept including information encoded for intra prediction. Herein, the intra prediction information reconstruction unit may use at least one of a plurality of intra prediction mode coding methods to reconstruct intra prediction information. The intra prediction information reconstruction unit may determine an intra prediction mode coding method based on information on a current decoding target block, which will be described later in detail.

The reference pixel configuration unit may determine a reference area required for intra prediction (S210). The reference area may refer to a neighboring area spatially adjacent to the current block, and may refer to a pre-reconstructed area before the current block. The reference area may include one or more reference lines. For example, the reference area may selectively include at least one of a first reference line, a second reference line, a third reference line, or a fourth reference line. Here, the first reference line may refer to a reference line adjacent to the left and/or top of the current block, and the second reference line may refer to a reference line adjacent to the left and/or top of the first reference line. The third reference line may refer to a reference line adjacent to the left and/or top of the second reference line, and the fourth reference line may refer to a reference line adjacent to the left and/or top of the third reference line.

The current block may perform intra prediction using a pre-determined number of reference lines. The number of reference lines 1) may be a fixed number pre-promised in the encoding/decoding apparatus, or 2) may be derived in the decoding apparatus based on information on block attributes. Or 3) Information on the number of reference lines may be encoded in the encoding apparatus, and may be signaled. The number may be determined using any one of the embodiments 1) to 3) described above, or may be derived based on a combination of at least two of the embodiments 1) to 3). The determined number of reference lines may be 0, 1, 2, 3 or 4.

The block attributes may refer to a position, a size, a shape, a ratio of width and height, a length value of width and height, a split type, a split depth, a value of intra prediction mode, whether the intra prediction mode is directional mode, an angle of the intra prediction mode, a component type (luma, chroma) and the like.

For example, it may be considered whether the current block position is adjacent to a boundary in the image. Here, a boundary may refer to a boundary between fragment images, and the fragment image may be a slice, a tile, a CTU row, a CTU, and the like. If the current block is adjacent to the boundary in the image, the upper reference area of the current block may be limited to include only p reference line(s).

Alternatively, the number of reference lines may be determined based on a comparison between the intra prediction mode of the current block and a pre-determined first threshold value. For example, when the intra prediction mode of the current block is less than a pre-determined first threshold value, p reference lines may be used, and when the intra prediction mode of the current block is equal to or greater than a pre-determined first threshold value, q reference lines may be used. The comparison may be a comparison of mode values or a comparison of angles of intra prediction modes. The first threshold value may be a value pre-defined in the encoding/decoding apparatus. For example, the first threshold value may mean information regarding at least one of a planner mode, a DC mode, a vertical mode, or a horizontal mode.

Alternatively, the number of reference lines may be determined based on the length values of the width and height of the current block. For example, when the width of the current block is greater than the height, the top reference area may include q reference lines, and the left reference area may include p reference lines. Alternatively, if the width of the current block is greater than a pre-determined second threshold value, the top reference area may include q reference lines, and otherwise, the top reference area may include p reference lines. The aforementioned p may be 0, 1 or 2, and q may be 1, 2, 3 or 4. p may be less than q.

The current block may select one or more reference lines among the first to fourth reference lines described above to perform intra prediction. Herein, the location of the reference line may be 1) a location pre-promised by the encoding/decoding apparatus, or 2) derived from the decoding apparatus based on the number information of the reference line described above. Alternatively, 3) in the encoding apparatus, information (mrl_idx) for specifying the location of the reference line may be encoded and signaled. The information (mrl_idx) may be signaled in consideration of at least one of the number information of reference lines or information on the above-described block attributes. The location may be determined using any one of the embodiments 1) to 3) described above, or may be determined based on a combination of at least two of the embodiments 1) to 3).

The above-described embodiment does not limit the number and location of reference lines. For example, the number of reference lines may be 5, 6, or more. The location of the reference line may belong to a neighboring block adjacent to the current block, or may belong to a neighboring block that is not adjacent to the current block.

There may be cases where the reference line is not available for intra prediction of the current block. The non-available case may be 1) when a reference line does not exist at the corresponding location, 2) when the reference line is located in a fragment image different from the current block, 3) when the reference line at the corresponding location has a coding order after the current block.

When the reference line is not available, the reference line at the corresponding location may be excluded from the reference area. Alternatively, a non-available reference line may be replaced using an available reference line. Here, the available reference line may include a neighboring sample of the non-available reference line, a neighboring sample of the current block, and the like. Here, the neighboring sample may mean a sample neighboring to at least one of left, right, top, bottom, or diagonal directions. The reference pixel configuration unit may additionally perform at least one of reference area padding and reference area filtering to configure a reference area. In the embodiment described below, the reference area of the current block for intra prediction may be determined identically or similarly.

The reference pixel interpolation unit may perform interpolation on the configured reference area (S220). For example, the reference pixel interpolation unit may perform interpolation between pixels according to an intra prediction mode.

The intra prediction unit may perform intra prediction, according to the reconstructed intra prediction mode, using the reference region (S230). The process of reconstructing the intra prediction mode will be described in detail with reference to FIG. 3. Different number of intra prediction modes may be used based on information about the current decoding target block.

However, the step of performing intra prediction using the different number of intra prediction modes and the step of using the plurality of intra prediction mode coding methods are not limited to apply only in one of several steps described with reference to FIG. 2, for example, may be performed in combination with one or more steps before and after.

The boundary filter unit may perform filtering on the boundary of the prediction block generated as a result of performing the intra prediction (S240). For filtering, a spatially adjacent pixel and/or pre-reconstructed pixel in the current picture may be used.

The block reconstruction unit may generate a reconstruction block by adding the prediction block and the residual block (S250).

Figure 3:
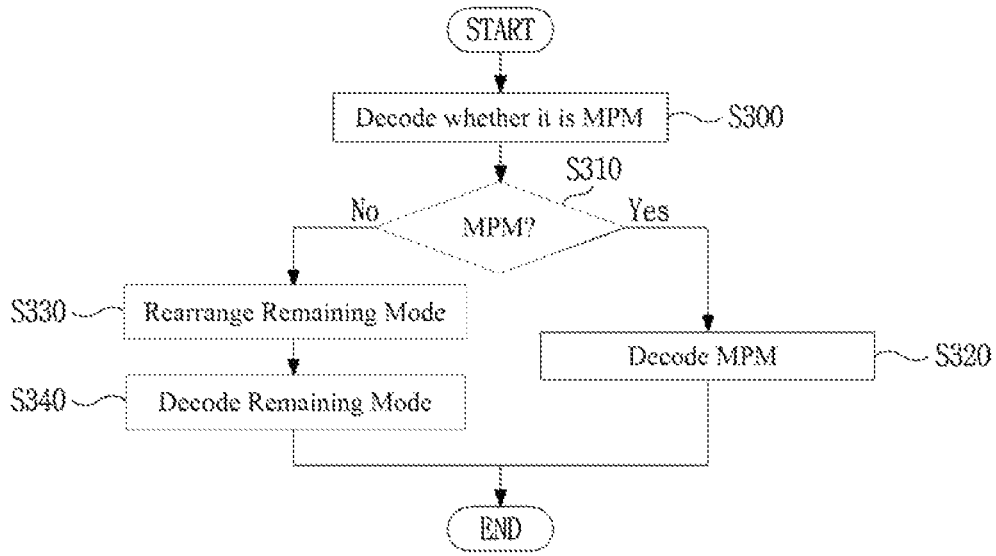
FIG. 3 is a diagram for explaining an intra prediction mode coding method according to an embodiment of the present invention.

FIG. 3 is a diagram for explaining an intra prediction mode coding method according to an embodiment of the present invention.

In the process of encoding and/or decoding the intra prediction mode, a plurality of intra prediction modes may be classified into one or more mode groups. In addition, a different intra prediction mode coding method may be used for each mode group.

For example, information for indicating a mode group to which the intra prediction mode of the current target block belongs among the one or more mode groups may be transmitted from an encoder to a decoder. Using the above information, a mode group to which the intra prediction mode of the current target block belongs may be specified. The intra prediction mode of the current target block may be encoded and decoded using one intra prediction mode coding method corresponding to the specified mode group.

Some of the one or more mode groups may include remaining modes other than the intra prediction mode belonging to another mode group. Also, a process of re-ordering the remaining modes may be performed. The encoding and/or decoding of the intra prediction mode may be performed based on the rearranged results.

Specifically, in step S300, an MPM list (or a candidate list) may be constructed based on one or more Most Probable Modes (MPMs), and information about whether an intra prediction mode of the current target block belongs to the MPMs may be obtained from a bitstream. The MPM may mean an intra prediction mode having a statistically high frequency. The method of constructing the MPM list will be described in detail with reference to FIGS. 4 and 6.

In step S310, it may be determined whether the intra prediction mode of the current target block belongs to the MPMs. The determination may be performed based on the information obtained in S300.

When the intra prediction mode of the current target block belongs to the MPMs, an MPM decoding step for obtaining one of the MPMs may be performed (S320).

If the intra prediction mode of the current target block does not belong to the MPMs, the remaining modes except the MPMs may be re-ordered in one list (S330).

In step S340, decoding may be performed to obtain one of the remaining modes based on the rearranged list.

The intra prediction mode (IntraPredMode) of the current target block may be derived based on the decoded mode in S320 or S340. For example, IntraPredMode of the current target block may be determined as the decoded mode. Alternatively, the IntraPredMode of the current target block may be changed by applying a pre-determined offset to the decoded mode.

The application of the offset may be selectively performed based on a property of a block, that is, at least one of a size, a shape, split information, split depth, a value of an intra prediction mode, or a component type. Here, the block may mean the current target block and/or a neighboring block of the current target block.

The split information may include at least one of first information indicating whether a current target block is split into a plurality of sub-blocks, second information indicating a split direction (e.g., horizontal or vertical), or third information relating to the number of the split sub-blocks. The split information may be encoded and signaled by an encoding apparatus. Alternatively, some of the split information may be variably determined in the decoding apparatus based on the above-described block properties, or may be set to a fixed value pre-defined in the encoding/decoding apparatus.

For example, if the first information is a first value, the current target block is split into a plurality of sub-blocks, otherwise, the current target block may not be split into a plurality of sub-blocks (NO_SPLIT). When the current target block is split into a plurality of sub-blocks, the current target block may be horizontally split (HOR_SPLIT) or vertically split (VER_SPLIT) based on the second information. Herein, the current target block may be split into k sub-blocks. Here, k may be an integer of 2, 3, 4 or more. Alternatively, k may be limited to an exponential power of 2, such as 1, 2, 4. Or, if at least one of the width or height of the current target block is 4 (for example, 4×8, 8×4), k may be set to 2, otherwise, k may be set to 4, 8, or 16. When the current target block is not split (NO_SPLIT), k may be set to 1.

The current target block may be split into sub-blocks having the same width and height, or may be split into sub-blocks having different widths and heights. The current target block may be split into N×M block units (e.g., 2×2, 2×4, 4×4, 8×4, 8×8, etc.) pre-promised in the encoding/decoding apparatus, regardless of the above-described block properties.

Meanwhile, the offset may be applied only when the size of the current target block is less than or equal to a pre-determined second threshold value. Here, the second threshold value may mean the maximum block size at which offset is allowed. Alternatively, it may be applied only when the size of the current target block is greater than or equal to a pre-determined third threshold value. In this case, the third threshold value may mean the minimum block size at which offset is allowed. The second/third threshold values may be signaled through a bitstream. Alternatively, it may be variably determined, in the decoding apparatus, based on at least one of the above-described block properties, or may be a fixed value pre-promised in the encoding/decoding apparatus.

Alternatively, the offset may be applied only when the shape of the current target block is non-square.

For example, when the following conditions are satisfied, IntraPredMode of the current target block may be changed by adding a pre-determined offset (e.g., 65) to the decoded mode.

nW is greater than nH

IntraPredMode is greater than or equal to 2

IntraPredMode is less than (whRatio>1) ? (8+2*whRatio):8

Here, nW and nH may mean the width and height of the current target block, respectively, and whRatio may be set to Abs(Log 2(nW/nH)).

Alternatively, when the following conditions are satisfied, IntraPredMode of the current target block may be changed by subtracting a pre-determined offset (e.g., 67) from the decoded mode.

nH is greater than nW

IntraPredMode is greater than or equal to 66

IntraPredMode is less than (whRatio>1) ? (60−2*whRatio):60

The current target block may perform intra prediction based on the decoded mode or the changed mode. The current target block may perform intra prediction in units of the aforementioned sub-blocks. Herein, a plurality of sub-blocks may be predicted in parallel, or may be sequentially predicted/reconstructed according to a pre-determined coding order.

Figure 4:
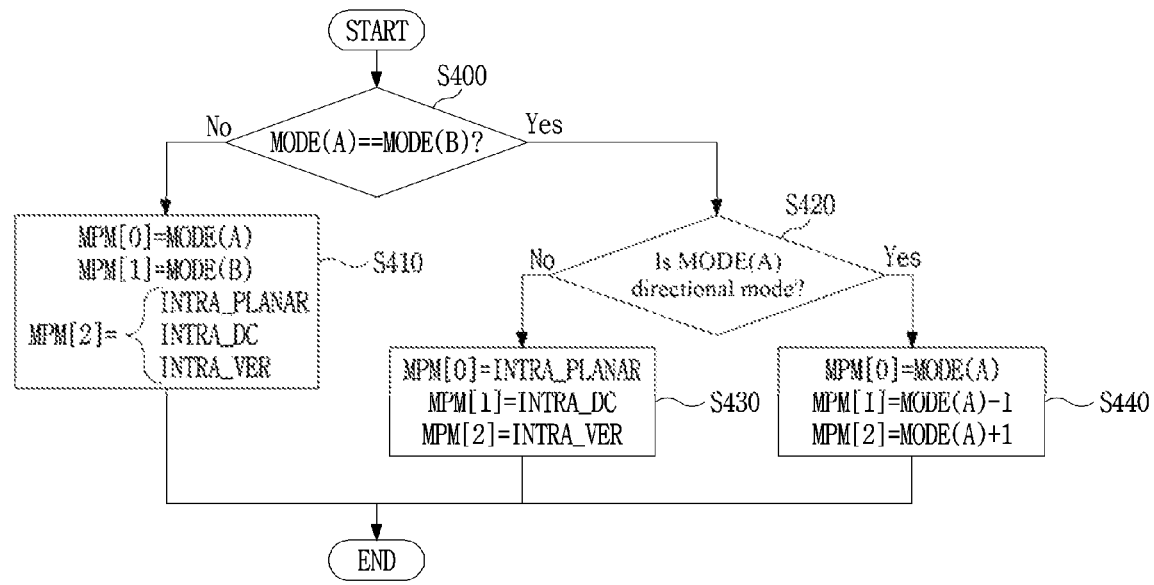
FIG. 4 is a diagram for explaining a method of constructing an MPM list according to an embodiment of the present invention.

FIG. 4 is a diagram for explaining a method of constructing an MPM list according to an embodiment of the present invention.

The encoding and/or decoding method of the intra prediction mode according to the present invention may generate a candidate list for the intra prediction mode of the current target block. According to the present invention, information on whether or not the intra prediction mode of the current target block belongs to the candidate list and/or information indicating which one of candidates in the candidate list (or MPM list) may be encoded/decoded.

According to the embodiment illustrated in FIG. 4, the intra prediction modes of two blocks adjacent to the current target block may be compared, and a candidate list may be constructed in one or more methods according to whether the two intra prediction modes are the same. The two adjacent blocks may include a block spatially adjacent to the current target block as well as a block temporally adjacent to the current target block. The spatially adjacent block may be a block in the current picture. The spatially adjacent block may include the left block (A) and/or the top block (B) of the current target block. When a plurality of blocks are present on the left side of the current target block, the left block A may be determined as a topmost or bottommost block. When a plurality of blocks are present at the top of the current target block, the top block B may be determined as the leftmost or rightmost block. For example, the left block may be determined as a block including the location of (xCb−1, yCb+cbHeight−1), and the top block may be determined as a block including the location of (xCb+cbWidth−1, yCb−1), respectively. Here, (xCb, yCb) indicates the location of the top-left pixel of the current target block, and cbHeight and cbWidth indicate the height and width of the current target block, respectively. The temporally adjacent block may be a block included in a picture other than the current picture (e.g., a reference picture).

In order to construct the MPM list, the intra prediction modes (MODE(A), MODE(B)) of two blocks adjacent to the current target block may be determined, and whether the two intra prediction modes are the same may be determined (S400).

When the intra prediction modes of two neighboring blocks are not the same, the MPM list may be constructed to include intra prediction modes (MODE(A), MODE(B)) of the two neighboring blocks of the current target block. Herein, in one embodiment, the two neighboring blocks may mean a left neighboring block and a top neighboring block. In addition, one mode not overlapping with MODE(A) and MODE(B) among Planar mode (INTRA PLANAR), DC mode (INTRA DC), and mode having vertical direction (INTRA VER) may be included in the MPM list as an MPM (S410).

When the intra-prediction modes of two neighboring blocks are the same, it may be determined whether the corresponding mode is an intra prediction mode having directionality (S420).

When the corresponding mode is an intra prediction mode having directionality, the MPM list may include a corresponding mode and two modes obtained by applying a pre-determined offset to the corresponding mode as MPMs (S440). The pre-determined offset may be, for example, +1, −1, but is not limited thereto, and may be, for example, +n, −m. In this case, n and m may be the same or different integers from each other.

When the corresponding mode is not an intra prediction mode having a directionality, the MPM list may include a planar mode, a DC mode, and a mode having a vertical directionality as the MPMs (S430).

Hereinafter, a method of constructing the MPM list will be described in detail. For convenience of description, it is assumed that the number N of intra prediction modes pre-defined in the encoding/decoding apparatus is 67, and the MPM list includes up to 6 MPMs.

The MPM list may include at least one of an intra prediction mode(s) of one or more neighboring blocks, a mode derived based on the intra prediction mode of the neighboring block, or a default mode pre-promised in the encoding/decoding apparatus. Here, when the intra prediction mode of the neighboring block is not available, the intra prediction mode of the neighboring block may be replaced with a non-directional mode (for example, a Planar mode or a DC mode). The non-available case is: 1) when a neighboring block does not exist at a corresponding position, 2) when a neighboring block is not encoded by intra prediction, 3) when a neighboring block is located in a fragment image different from the current block. For example, if the neighboring block belongs to a different CTU from the current block (for example, when the current block is adjacent to the top boundary of the CTU), the neighboring block is determined to be unavailable, and the intra prediction mode of the neighboring block may be set to a non-directional mode.

The MPM list may be constructed based on at least one of 1) whether the IntraPredMode (hereinafter referred to as Mode A) of the left block A and the IntraPredMode (hereinafter referred to as Mode B) of the top block B are the same, 2) whether Mode A and Mode B are directional modes, 3) the difference between mode A and mode B, 4) the location of the reference line of the current block, or 5) split information of the current block. Here, the reference line is as described with reference to FIG. 2 and the split information is as described with reference to FIG. 3, and a detailed description thereof will be omitted.

1. Case where Mode A and Mode B are the Same, and Mode A is a Directional Mode (1) When the Reference Area of the Current Block is the First Reference Line, and the Current Block is Non-Split (NO_SPLIT)

The MPM of the current block may include at least one of mode A, a PLANAR mode, a DC mode, modes derived by subtracting/adding 1 from/to mode A, or modes derived by subtracting/adding 2 from/to mode A. An index (MPM_Idx) may be assigned, based on a pre-determined priority, to the MPM. For example, an index may be assigned to each MPM as shown in Table 1 below. However, the priority of the present invention is not limited to Table 1, and the position of the MPM in the MPM list may be different from Table 1.

TABLE 1

| MPM_Idx | MPM |
| --- | --- |
| 0 | mode A |
| 1 | PLANAR |
| 2 | DC |
| 3 | 2 + ((mode A + 61) %64) |
| 4 | 2 + ((mode A − 1) %64) |
| 5 | 2 + ((mode A + 60) %64) |

(2) When the Reference Area of the Current Block is not the First Reference Line, or when the Current Block is not Non-Split (NO_SPLIT)

The MPM of the current block may include at least one of mode A or modes derived by subtracting/adding 1 from/to mode A. An index (MPM_Idx) may be assigned, based on a pre-determined priority, to the MPM. For example, an index may be assigned to each MPM as shown in Table 2 below. However, the priority of the present invention is not limited to Table 2, and the position of the MPM in the MPM list may be different from Table 2.

TABLE 2

| MPM_Idx | MPM |
| --- | --- |
| 0 | mode A |
| 1 | 2 + ((mode A + 61) %64) |
| 2 | 2 + ((mode A − 1) %64) |

In addition, when any one of the following conditions is satisfied (CASE 1), the MPM list may further include at least one of modes derived by subtracting/adding 2 from/to mode A or modes derived by subtracting/adding 3 from/to mode A.—[Condition 1] The current block is a horizontal split (HOR_SPLIT), and mode A is a mode having horizontal directionality (mode A<mode 34).

[Condition 2] The current block is a vertical split (VER_SPLIT), and mode A is a mode having vertical directionality (mode A>=mode 34).

[Condition 3] The reference area of the current block is not the first reference line.

On the other hand, when all of the conditions is not satisfied (CASE 2), the MPM list may further include at least one of a pre-determined default mode or a PLANAR mode. Here, the default mode may be determined based on split information of the current block (particularly, second information regarding the split direction). Specifically, when the current block is horizontally split, the default mode may be set to a mode having horizontal directionality. The mode having horizontal directionality may be n modes in the range of mode 3 to mode 33. Here, n may be an integer of 1, 2, 3 or more. For example, the default mode may be set to mode 18 (horizontal mode), mode 5, or the like. Similarly, when the current block is vertically split, the default mode may be set to a mode having vertical directionality. The mode having the vertical directionality may be m modes in the range of mode 35 to mode 65. Here, m may be an integer of 1, 2, 3 or more. For example, the default mode may be set to mode 50 (vertical mode), mode 63, or the like. The n and m may be the same, or may be different from each other.

An index (MPM_Idx) may be assigned, based on a pre-determined priority, to the MPM. For example, an index may be assigned to each MPM as shown in Table 3 below. However, the priority of the present invention is not limited to Table 3, and the position of the MPM in the MPM list may be different from Table 3.

TABLE 3

| MPM_Idx | CASE 1 | CASE 2 |
|---|---|---|
| 3 | 2 + ((mode A + 60) %64) | default mode 1 |
| 4 | 2 + (mode A %64) | default mode 2 |
| 5 | 2 + ((mode A + 59) %64) | PLANAR |

The PLANAR mode of CASE 2 may be replaced with a DC mode, or may be replaced with another default mode. The index may be assigned such that the PLANAR mode or DC mode has a higher priority than the default mode.

2. Case where Mode A and Mode B are not the Same, and Mode a or Mode B is a Directional Mode (1) When Both Mode A and Mode B are Directional Modes a) When the Reference Area of the Current Block is the First Reference Line, and the Current Block is Non-Split (NO_SPLIT)

The MPM of the current block may include at least one of a mode A, a mode B, a PLANAR mode, a DC mode, modes derived by subtracting/adding 1 from/to maxAB, or modes derived by subtracting/adding 2 from/to maxAB. An index (MPM_Idx) may be assigned, based on a pre-determined priority, to the MPM. For example, an index may be assigned to each MPM as shown in Table 4 below. However, the priority of the present invention is not limited to Table 4, and the position of the MPM in the MPM list may be different from Table 4. Here, maxAB denotes the maximum value of mode A and mode B, and minAB denotes the minimum value of mode A and mode B, respectively.

TABLE 4

| MPM_Idx | CASE 1 If (2 =<(maxAB-minAB) =< 62 ) | CASE 2 Otherwise |
|---|---|---|
| 0 | mode A | mode A |
| 1 | mode B | mode B |
| 2 | PLANAR | PLANAR |
| 3 | DC | DC |
| 4 | 2 + ((maxAB + 61) %64) | 2 + ((maxAB + 60) %64) |
| 5 | 2 + ((maxAB − 1) %64) | 2 + (maxAB %64) |

In CASE 2 of Table 4, the mode with index 5, (2+(maxAB % 64)), may be replaced with (2+((maxAB−1)% 64)). In this case, the index may be assigned such that the mode with index 5 has a higher priority than the mode with index 4.

b) When the Reference Area of the Current Block is not the First Reference Line, or if the Current Block is not Non-Split (NO_SPLIT)

The MPM of the current block may include at least one of a mode A, a mode B, a PLANAR mode, a DC mode, modes derived by subtracting/adding 1 from/to maxAB, modes derived by subtracting/adding 2 from/to maxAB, modes derived by subtracting/adding 1 from/to minAB, or modes derived by subtracting/adding 2 from/to minAB. As described in Table 5, the MPM list may be constructed adaptively based on the comparison result between the difference between maxAB and minAB and a pre-determined threshold value.

An index (MPM_Idx) may be assigned, based on a pre-determined priority, to the MPM. For example, an index may be assigned to each MPM as shown in Table 5 below. However, the priority of the present invention is not limited to Table 5, and the position of the MPM in the MPM list may be different from Table 5.

TABLE 5

| MPM_Idx | CASE 1 If ((maxAB-minAB) = 1) | CASE 2 If ((maxAB-minAB) = 2) | CASE 3 If ((maxAB-minAB) > 61) | CASE 4 Otherwise |
|---|---|---|---|---|
| 0 | mode A | mode A | mode A | mode A |
| 1 | mode B | mode B | mode B | mode B |
| 2 | 2 + ((minAB + 61) %64) | 2 + ((minAB − 1) %64) | 2 + ((minAB − 1) %64) | 2 + ((minAB + 61) %64) |
| 3 | 2 + ((maxAB − 1)%64) | 2 + ((minAB + 61) %64) | 2 + ((maxAB + 61) %64) | 2 + ((minAB − 1) %64) |
| 4 | 2 + ((minAB + 60) %64) | 2 + ((maxAB − 1) %64) | 2 + (minAB %64) | 2 + ((maxAB + 61) %64) |
| 5 | 2 + (maxAB %64) | 2 + ((minAB + 60) %64) | 2 + ((maxAB + 60) %64) | 2 + ((maxAB − 1) %64) |

However, when the current block is not non-split, and Abs (mode B-default mode) is smaller than Abs (mode A-default mode), mode B may be arranged at index 0 in Table 5 and mode A is arranged at index 1. The default mode is determined based on the split direction of the current block, as described above, and detailed description will be omitted.

(2) Case where Either Mode A or Mode B is a Directional Mode a) When the Reference Area of the Current Block is the First Reference Line, and the Current Block is Non-Split (NO_SPLIT)

The MPM of the current block may include at least one of a mode A, a mode B, a non-directional mode, modes derived by subtracting/adding 1 from/to maxAB, or modes derived by subtracting/adding 2 from/to maxAB.

An index (MPM_Idx) may be assigned, based on a pre-determined priority, to the MPM. For example, an index may be assigned to each MPM as shown in Table 6 below. However, the priority of the present invention is not limited to Table 6, and the position of the MPM in the MPM list may be different from Table 6.

TABLE 6

| MPM_Idx | MPM |
|---|---|
| 0 | mode A |
| 1 | mode B |
| 2 | 1−minAB |
| 3 | 2 + ((maxAB + 61) %64) |
| 4 | 2 + ((maxAB − 1) %64) |
| 5 | 2 + ((maxAB + 60) %64) |

In Table 6, index 0 is assigned to mode A and index 1 is assigned to mode B, but the present invention is not limited thereto. For example, index 0 may be assigned to the directional mode of mode A and mode B, and index 1 may be assigned to the other. Or, on the contrary, index 0 may be assigned to the non-directional mode of mode A and mode B, and index 1 may be assigned to the other. When (1−minAB) of index 2 is a PLANAR mode, an index may be assigned to have a higher priority than DC mode.

b) When the Reference Area of the Current Block is not the First Reference Line

When the reference area of the current block is not the first reference line, it may be restricted that the non-directional mode is used as the MPM. In this case, the MPM list may be constructed based on the maximum value (maxAB) of mode A and mode B. For example, the MPM of the current block may include at least one of maxAB, modes derived by subtracting/adding 1 from/to maxAB, modes derived by subtracting/adding 2 from/to maxAB, or modes derived by subtracting/adding 3 from/to maxAB.

An index (MPM_Idx) may be assigned, based on a pre-determined priority, to the MPM. For example, an index may be assigned to each MPM as shown in Table 7 below. However, the priority of the present invention is not limited to Table 7, and the position of the MPM in the MPM list may be different from Table 7.

TABLE 7

| MPM_Idx | MPM |
|---|---|
| 0 | maxAB |
| 1 | 2 + ((maxAB + 61) %64) |
| 2 | 2 + ((maxAB − 1) %64) |

TABLE 7-continued

| MPM_Idx | MPM |
|---|---|
| 3 | 2 + ((maxAB + 60) %64) |
| 4 | 2 + (maxAB %64) |
| 5 | 2 + ((maxAB + 59) %64) | c) When the Reference Area of the Current Block is the First Reference Line, and the Current Block is not Non-Split The MPM of the current block may include at least one of a non-directional mode, modes derived by subtracting/adding 1 from/to maxAB, or modes derived by subtracting/adding 2 from/to maxAB.

An index (MPM_Idx) may be assigned, based on a pre-determined priority, to the MPM. For example, an index may be assigned to each MPM as shown in Table 8 below. However, the priority of the present invention is not limited to Table 8, and the position of the MPM in the MPM list may be different from Table 8.

TABLE 8

| MPM_Idx | MPM |
|---|---|
| 0 | PLANAR |
| 1 | maxAB |
| 2 | 2 + ((maxAB + 61) %64) |
| 3 | 2 + ((maxAB − 1) %64) |
| 4 | 2 + ((maxAB + 60) %64) |
| 5 | 2 + (maxAB %64) |

In Table 8, PLANAR mode is arranged at index 0, but is not limited thereto. For example, the PLANAR mode may be replaced with the non-directional mode 'minAB' or the DC mode. Alternatively, the non-directional mode, (1−minAB), may be included in the MPM list. Herein, (1−minAB) may be arranged between the PLANAR mode and maxAB, or may be arranged to have a higher priority than any one of indexes 2 to 5. Alternatively, (1−minAB) may be arranged at index 5.

(3) When Both Mode A and Mode B are Non-Directional Modes a) When the Reference Area of the Current Block is the First Reference Line, and the Current Block is Non-Split (NO_SPLIT)

The MPM of the current block may include at least one of a mode A, a mode B, or one or more modes with vertical directionality (Embodiment 1). Here, the modes with the vertical directionality may further include a neighboring mode apart from the mode 50 by a pre-determined interval i as well as the vertical mode (mode 50). Here, i may mean an integer of 1, 2, 3, 4, 5, 6, 7, 8 or more. The i may be a value pre-promised in the encoding/decoding apparatus. The neighboring mode may be derived by subtracting/adding i from/to mode 50.

Alternatively, the MPM of the current block may include at least one of a mode A, a mode B, or one or more modes with horizontal directionality (Embodiment 2). Here, the mode with the horizontal directionality may further include a neighboring mode apart from mode 18 by a pre-determined interval i as well as the horizontal mode (mode 18). Here, i may mean an integer of 1, 2, 3, 4, 5, 6, 7, 8 or more. The i may be a value pre-promised in the encoding/decoding apparatus. The neighboring mode may be derived by subtracting/adding i from/to mode 18.

The MPM list may be constructed based on one of the above-described Embodiment 1 or Embodiment 2, or may be constructed based on a combination of Embodiment 1 and Embodiment 2.

An index (MPM_Idx) may be assigned, based on a pre-determined priority, to the MPM. For example, an index may be assigned to each MPM as shown in Table 9 below. However, the priority of the present invention is not limited to Table 9, and the position of the MPM in the MPM list may be different from Table 9.

TABLE 9

| MPM_Idx | Embodiment 1 | Embodiment 2 |
|---|---|---|
| 0 | mode A | mode A |
| 1 | mode B | mode B |
| 2 | mode 50 | mode 18 |
| 3 | mode 18 | mode 50 |
| 4 | mode 46 | mode 14 |
| 5 | mode 54 | mode 22 |

Meanwhile, in Table 9, mode A is arranged at index 0 and mode B at index 1, but is not limited thereto. minAB may be arranged at index 0, and maxAB may be arranged at index 1, respectively. Alternatively, maxAB may be arranged at index 0, and minAB may be arranged at index 1, respectively.

b) When the Reference Area of the Current Block is not the First Reference Line

The MPM of the current block may include a default mode pre-promised in the encoding/decoding apparatus. Here, the pre-promised default mode may include at least one of mode 50 (vertical mode), mode 18 (horizontal mode), mode 2 (bottom-left diagonal mode), mode 34 (top-left diagonal mode) or mode 66 (top-right diagonal mode).

In addition, the MPM of the current block may further include a neighboring mode apart from any one of the default modes described above by a pre-determined interval i. Here, i may mean an integer of 1, 2, 3, 4, 5, 6, 7, 8 or more. The i may be a value pre-promised in the encoding/decoding apparatus.

An index (MPM_Idx) may be assigned, based on a pre-determined priority, to the MPM. For example, an index may be assigned to each MPM as shown in Table 10 below. However, the priority of the present invention is not limited to Table 10, and the position of the MPM in the MPM list may be different from Table 10. For example, mode 18 may have a higher priority than mode 50. Alternatively, mode 34 may have a higher priority than mode 2, or may have a lower priority than mode 66.

TABLE 10

| MPM_Idx | MPM |
|---|---|
| 0 | mode 50 |
| 1 | mode 18 |
| 2 | mode 2 |
| 3 | mode 34 |
| 4 | mode 66 |
| 5 | mode 26 | c) When the Reference Area of the Current Block is the First Reference Line, and the Current Block is not Non-Split The MPM of the current block may include at least one of a PLANAR mode, a mode with horizontal directionality, or a mode with vertical directionality. Here, the modes with horizontal/vertical directionality is as described above, and detailed description will be omitted.

However, in the case of horizontal split (HOR_SPLIT), the MPM list may include p mode(s) with horizontal directionality and q mode(s) with vertical directionality. Here, p may be greater than q. For example, p may be 3, 4 or 5, and q may be 0, 1, or 2. In this case, the mode with horizontal directionality may be arranged with a higher priority than the mode with vertical directionality.

On the other hand, in the case of vertical split (VER_SPLIT), the MPM list may include p mode(s) with horizontal directionality and q mode(s) with vertical directionality. Here, p may be less than q. For example, p may be 0, 1, or 2, and q may be 3, 4, or 5. In this case, a mode with vertical directionality may be arranged with a higher priority than a mode with horizontal directionality.

An index (MPM_Idx) may be assigned, based on a pre-determined priority, to the MPM. For example, an index may be assigned to each MPM as shown in Table 11 below. However, the priority of the present invention is not limited to Table 11, and the position of the MPM in the MPM list may be different from Table 11.

TABLE 11

| MPM_Idx | HOR_SPLIT | VER_SPLIT |
|---|---|---|
| 0 | PLANAR | PLANAR |
| 1 | mode 18 | mode 50 |
| 2 | mode 25 | mode 43 |
| 3 | mode 10 | mode 60 |
| 4 | mode 65 | mode 3 |
| 5 | mode 50 | mode 18 |

The MPM list may be constructed as a table pre-defined in the encoding/decoding apparatus as shown in Table 11, or may be constructed based on a default mode determined according to split information of the current block (particularly, second information about the split direction).

In the above-described embodiment, the MPM list is composed of six MPMs, but may not be limited thereto. For example, the MPM list may be composed of M MPMs, where M may be 3, 4, and 5. In this case, an MPM list may be generated based on M MPMs having high priority. That is, in the above-described embodiment, an MPM list may be generated based on the MPM having an index of 0 to (M−1).

Figure 5:
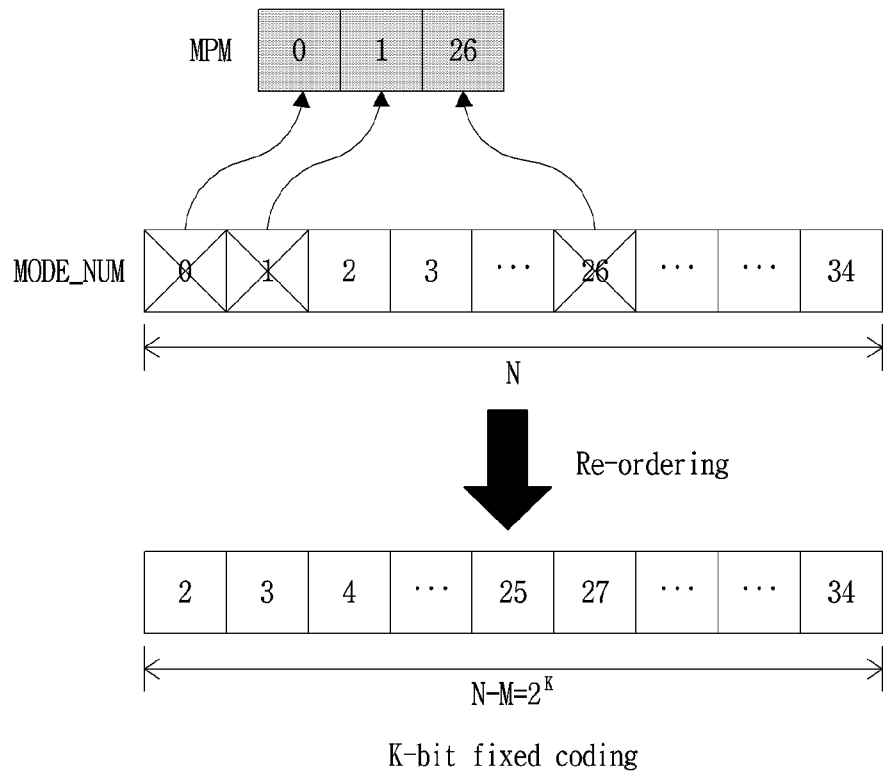
FIG. 5 is a diagram for explaining an embodiment of rearranging and encoding for the remaining modes after constructing the MPM list.

FIG. 5 is a diagram for explaining an embodiment of rearranging and encoding for the remaining modes after constructing the MPM list.

When the intra prediction mode of the current target block does not belong to the MPM list, the remaining modes may be rearranged as one list, and the intra prediction mode may be encoded/decoded using the rearranged list.

In the embodiment illustrated in FIG. 5, it is assumed that the number N of intra prediction modes applicable to the current target block is 35. However, N is not limited thereto, and may have various values as described below. In addition, it is assumed that the MPM list includes three MPMs. However, similarly, the number of MPMs that can be included in the MPM list is not limited to 3, and the MPM list may include M MPMs. For example, M may be 6.

As shown in FIG. 5, after M (3) modes of N (35) applicable intra prediction modes are determined as MPMs, a single list may be generated by re-ordering the (N−M) remaining modes. The reordering is to arrange the (N−M) remaining modes according to a pre-determined criterion, for example, in ascending order.

The intra prediction mode coding may be performed for the (N−M) remaining modes using the reordered list. In this case, as the intra prediction mode coding method, one of coding methods such as a K-bit fixed length coding, a truncated unary arithmetic, and the like coding may be selected.

Figure 6:
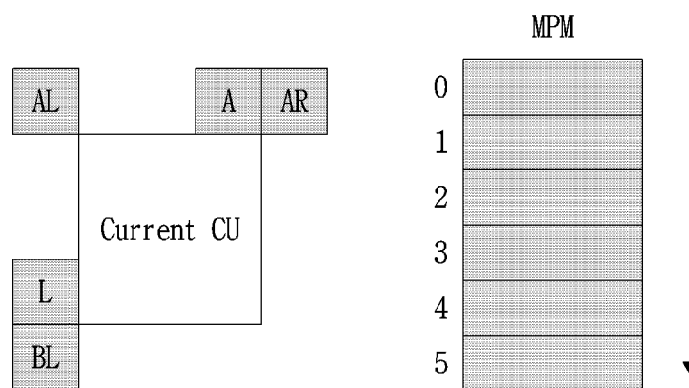
FIG. 6 is a diagram for explaining another embodiment constructing the MPM list.

FIG. 6 is a diagram for explaining another embodiment constructing the MPM list.

In constructing the MPM list, one or more blocks adjacent to the current target block (Current CU) may be considered. The adjacent block may include at least one of a left block (Left, L), a top block (Above, A), a bottom-left block (Bottom Left, BL), a top-right block (Above Right, AR), or a top-left block (Above Left, AL).

The number of MPMs included in the MPM list may be adaptively determined based on information of the current target block. The information of the current target block may include a size, a split depth, a shape, a component of the current target block, and/or the number of intra prediction modes applicable to the current target block.

In the embodiment illustrated in FIG. 6, the number of intra prediction modes applicable to the current target block may be 67, and the number of MPMs that may be included in the MPM list may be 6.

In the embodiment illustrated in FIG. 6, intra prediction modes of blocks adjacent to the current target block may be included in the MPM list in a pre-defined order. Also, the MPM list may include a non-directional mode among intra prediction modes. The non-directional mode may mean a planar mode and/or a DC mode. That is, intra prediction modes of blocks adjacent to the current target block and the non-directional mode may be included in the MPM list as MPM candidates.

The MPM list does not include the same candidate redundantly. To this end, whether the pre-included MPM candidate and the MPM candidate to be included are the same may be checked. Therefore, even if the MPM candidates are added to the MPM list, the MPM list may not be filled. In this case, an MPM candidate to be included in the MPM list may be additionally determined by using the directional intra prediction mode early inserted into the list among the intra prediction modes already added to the MPM list.

For example, as described with reference to FIG. 4, a mode (MODE(ANG)−1, MODE(ANG)+1) obtained by applying the directional intra prediction mode to a pre-determined offset may be determined as an MPM candidate. The pre-determined offset may be, for example, +1, −1, but is not limited thereto, and may be, for example, +n, −m. In this case, n and m may be the same or different integers from each other.

When the MPM list is not still filled, a pre-determined default mode, which will be described later, may be used, or a mode obtained by applying an offset to the directional intra prediction mode inserted into the MPM list in the same manner as the next order may be determined as the MPM candidate.

The pre-determined default mode may include at least one of a vertical direction mode (MODE(VER)), a horizontal direction mode (MODE(HOR)), a bottom-left diagonal mode (MODE(BL_DIA)), or a top-right diagonal mode (MODE(AR_DIA)). The pre-determined default mode may be added to the MPM list in a pre-determined order.

The pre-defined order of including MPM candidates in the MPM list for the current target block may vary depending on the information of the current target block, or may include removing a specific candidate mode among MPM candidates. The information of the current target block may include at least one of a size, a split depth, a shape, a component of the current target block, or the number of intra prediction modes applicable to the current target block.

In the embodiment described with reference to FIG. 6, the MPM candidates included in the MPM list and the insertion order may be as follows.

MODE(L)⇒MODE(A)⇒MODE(PLANAR)⇒MODE (DC)⇒MODE(BL)⇒MODE(AR)⇒MODE(AL)⇒MODE (ANG)−1⇒MODE(ANG)+1⇒MODE(VER)⇒MODE (HOR)⇒MODE(BL_DIA)⇒MODE(AR_DIA)⇒

Figure 7:
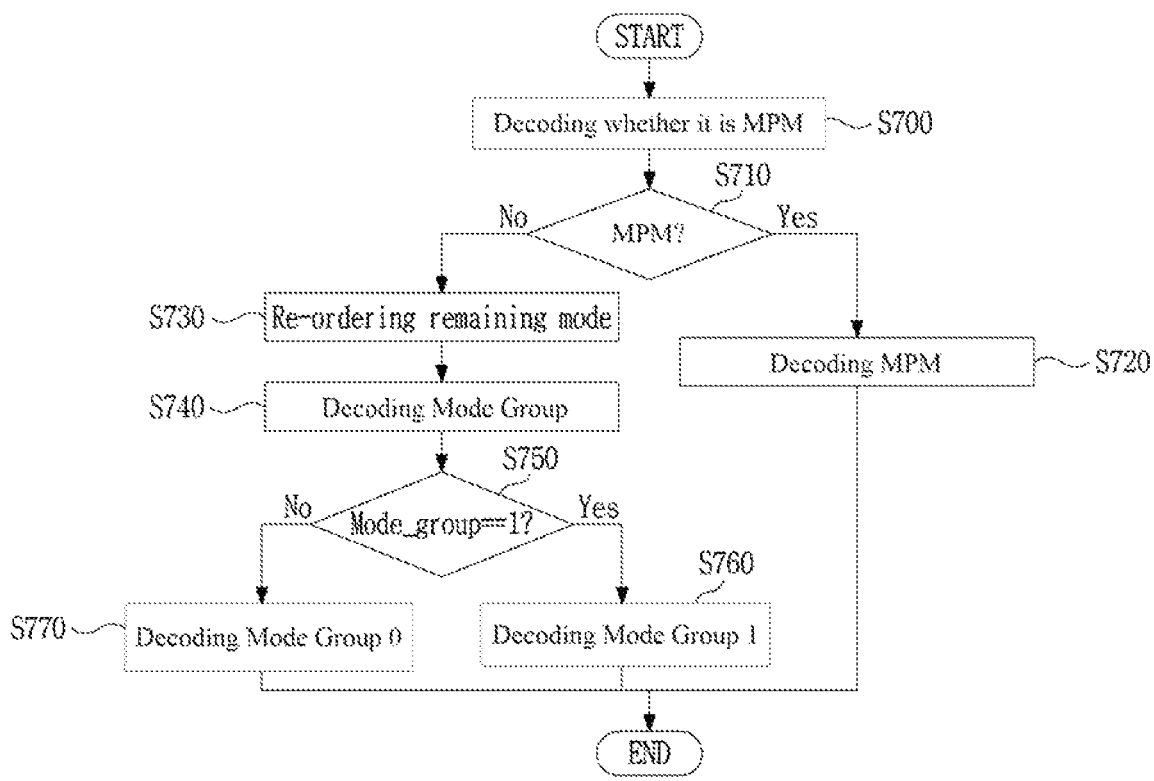
FIG. 7 is a diagram for explaining another embodiment of an intra prediction mode coding method according to the present invention.

FIG. 7 is a diagram for explaining another embodiment of an intra prediction mode coding method according to the present invention.

According to the embodiment illustrated in FIG. 7, a plurality of intra prediction modes may be classified into one or more mode groups. In addition, a different intra prediction mode coding method may be used for each mode group. Information for indicating a mode group to which the intra prediction mode of the current target block belongs among the one or more mode groups may be transmitted from an encoder to a decoder. The decoder may determine an intra prediction mode coding method corresponding to a mode group to which the intra prediction mode of the current target block belongs using the information. The intra prediction mode of the current target block may be encoded and/or decoded based on the determined intra prediction mode coding method.

For some of the one or more mode groups, a process of re-ordering the remaining modes except for the intra prediction mode belonging to another mode group may be performed. The intra prediction mode of the current target block may be encoded and/or decoded using the rearranged results.

In decoding the intra prediction mode according to an embodiment of the present invention illustrated in FIG. 7, an MPM list including MPM candidates may be constructed, and information on whether the intra prediction mode of the current target block belongs to the MPM list may be decoded from the bitstream (S700).

Based on the decoded information, it may be determined whether the intra prediction mode of the current target block belongs to the MPM list (S710).

When the intra prediction mode of the current target block belongs to the MPM list, the intra prediction mode of the current target block may be decoded by decoding information for obtaining one of the modes included in the MPM list (S720).

When the intra prediction mode of the current target block does not belong to the MPM list, the remaining modes except for the MPM candidates included in the MPM list may be rearranged into one list (S730).

The rearranged remaining modes may be classified into one or more mode groups. Also, a mode list may be constructed for each group.

Information about a mode group to which the intra prediction mode of the current target block belongs among the one or more mode groups may be decoded (S740).

The mode group to which the intra prediction mode of the current target block belongs may be determined using the information about the decoded mode group. In addition, the intra prediction mode of the current target block may be decoded using the intra prediction mode coding method corresponding to the determined mode group (S760, S770).

In the embodiment illustrated in FIG. 7, the remaining modes are classified into two mode groups. However, the number of mode groups is not limited to this, and the number of mode groups may be two or more. The number of mode groups may be encoded in a bitstream and transmitted, or may be preset in the encoder and decoder. Alternatively, it may be adaptively determined based on information of the current target block. The information of the current target block may include at least one of the size, split depth, shape, component of the current target block, and the number of intra prediction modes applicable to the current target block. The number of modes included in each mode group may be different for each group or may be the same. Or, it may be different only for some of the plurality of mode groups.

Figure 8:
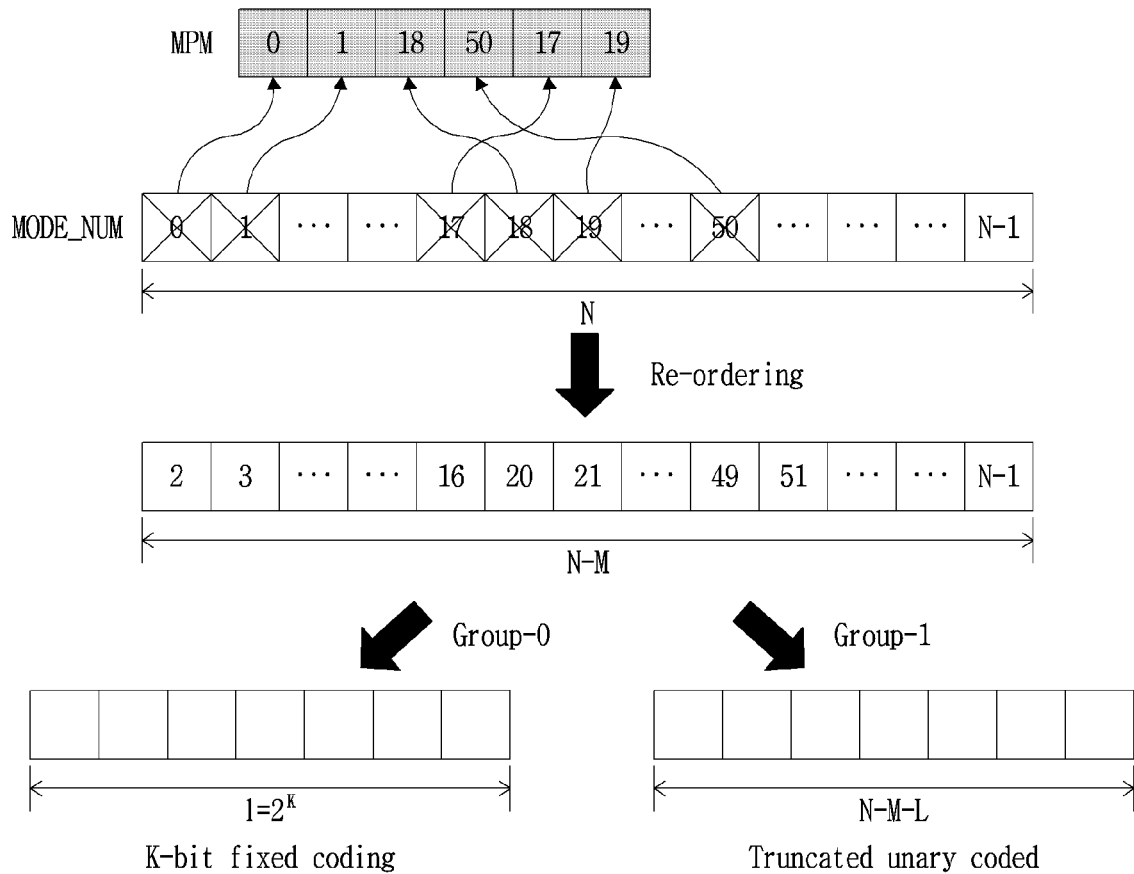
FIG. 8 is a diagram for explaining another embodiment of reordering and encoding for the remaining modes after constructing the MPM list.

FIG. 8 is a diagram for explaining another embodiment of reordering and encoding for the remaining modes after constructing the MPM list.

According to the embodiment illustrated in FIG. 8, when the intra prediction mode of the current target block does not belong to the MPM list, the intra prediction mode coding may be performed by classifying the remaining modes into a plurality of mode groups to encode and/or decode the intra prediction mode of the current target block.

Specifically, when the intra prediction mode of the current target block does not belong to the MPM list, the remaining modes except the modes belonging to the MPM list may be rearranged as one independent list. The rearranged remaining modes may be classified into a plurality of mode groups. In addition, the intra prediction mode of the current target block may be encoded and/or decoded using the intra prediction mode coding method corresponding to each mode group.

In the embodiment illustrated in FIG. 8, among all N intra prediction modes, M MPM modes may be extracted to generate an MPM list. In this case, M may be, for example, 6.

Among the N intra prediction modes, (N−M) remaining modes except for the M MPM modes may be arranged in a pre-determined order, for example, in ascending order, to generate a single list.

The rearranged list may be further classified into one or more lists. The intra prediction mode may be encoded and/or decoded using a different intra prediction mode coding method according to each additionally classified list.

The intra prediction mode coding method may be one of coding methods such as a K-bit fixed length coding and a truncated unary arithmetic coding, etc.

For example, the rearranged list including (N−M) remaining modes may be classified into Group-0 including L modes and Group-1 including (N−M−L) modes. The K-bit fixed length coding may be applied for Group-0 and the truncated unary arithmetic coding may be applied to Group-1.

Figure 9:
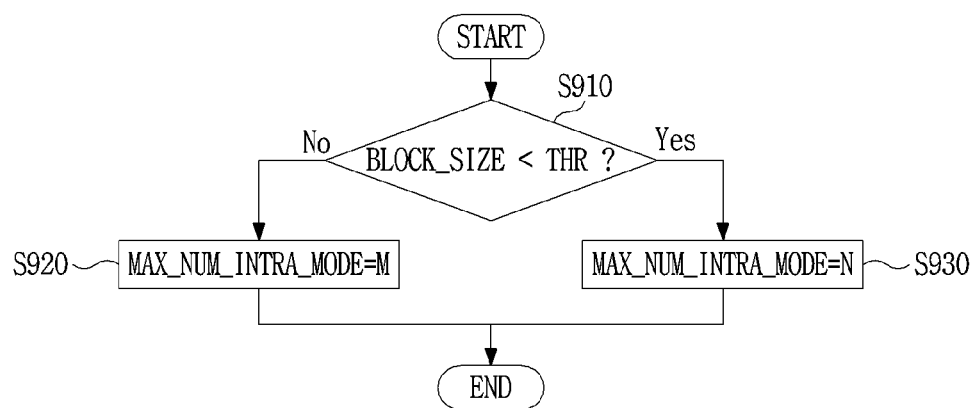
FIG. 9 is a diagram for explaining an embodiment of using a different number of intra prediction modes according to the size of a current target block.

FIG. 9 is a diagram for explaining an embodiment of using a different number of intra prediction modes according to the size of a current target block.

According to the embodiment illustrated in FIG. 9, the number of intra prediction modes used by the current target block may be determined by comparing the size of the current target block with a specific size. For example, when the size of the current target block is 16×16 or more, the intra prediction may be performed using up to 67 intra prediction modes, and when it is less than 16×16, the intra prediction may be performed using up to 35 intra prediction modes.

In decoding the intra prediction mode according to the embodiment illustrated in FIG. 9, the size of the current target block may be compared with a pre-determined value (THR: Threshold) (S910).

Depending on whether the size of the current target block is larger or smaller than a pre-determined value, the maximum number of intra prediction modes (MAX_NUM_INTRA_MODE) that can be used by the current target block may be determined (S920, S930).

The pre-determined value may be a value pre-defined in the encoder and decoder. Alternatively, it may be determined and encoded by an encoder, and then transmitted to a decoder. When transmitted from an encoder to a decoder, information on the pre-determined value may be included and transmitted in units such as a sequence, a picture, a tile, a slice, and a maximum coding block, which are higher levels of a block. In addition, the pre-determined value may have one or more values.

Figure 10:
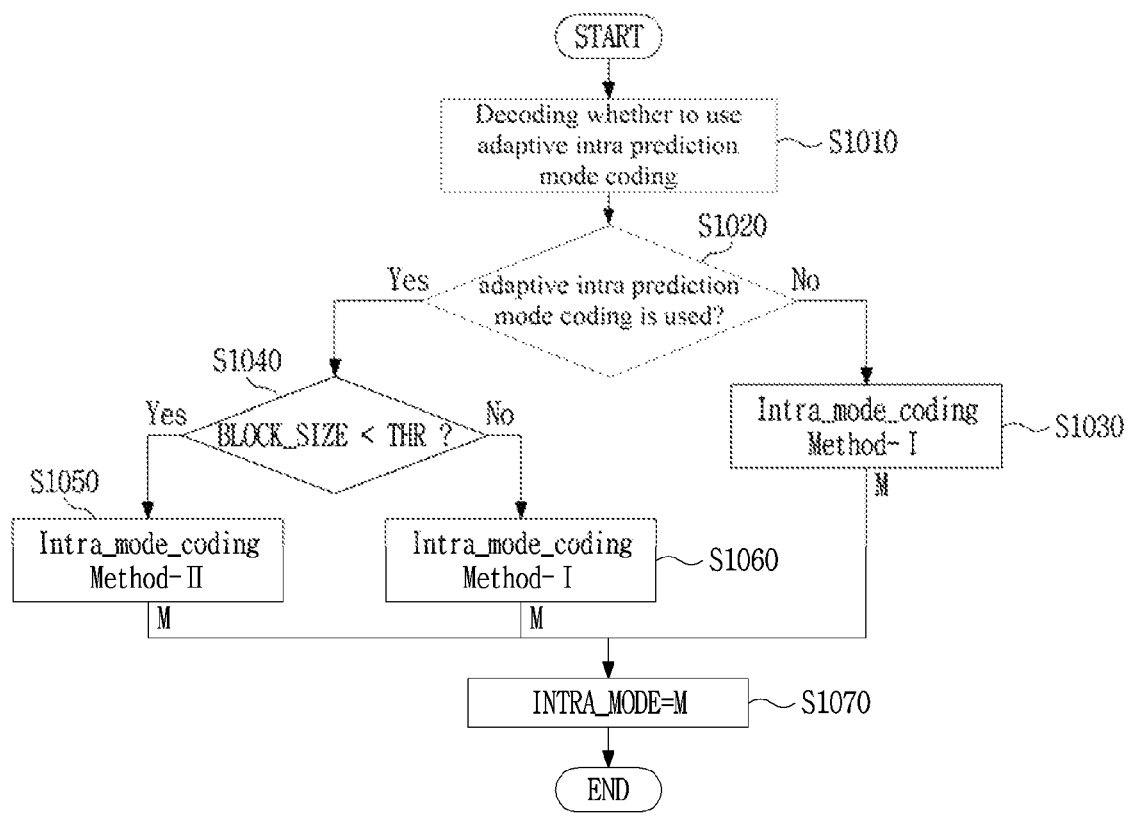
FIG. 10 is a diagram for explaining an embodiment of using different intra prediction mode coding methods according to the size of a current target block.

FIG. 10 is a diagram for explaining an embodiment of using different intra prediction mode coding methods according to the size of a current target block.

According to the embodiment illustrated in FIG. 10, an intra prediction mode coding method to be applied to a current target block may be determined based on a result of comparing a block size with a pre-determined value.

In decoding the intra-prediction mode according to the embodiment illustrated in FIG. 10, information on whether adaptive intra prediction mode coding is used for the current target block may be decoded (S1010). The information on whether the adaptive intra prediction mode coding is used may be a pre-defined value in the encoder and decoder, or may be determined in the encoder and transmitted to the decoder. When transmitted from an encoder to a decoder, the information may be included and transmitted in a higher unit of a block such as a sequence, a picture, a tile, a slice, a maximum coding block, or may be information transmitted in block units.

Based on the decoded information, it may be determined whether the adaptive intra prediction mode coding has been used for the current target block (S1020).

When the adaptive intra prediction mode coding is not used for the current target block, a pre-defined intra prediction mode coding method (Intra_mode_coding Method-I) may be determined as a method for decoding the intra prediction mode of the current target block regardless of the size of the current target block (S1030).

When the adaptive intra prediction mode coding is used for the current target block, the size of the current target block may be compared with a pre-determined value (THR) (S1040).

One of a plurality of different intra prediction mode coding methods may be determined as a method for decoding the intra prediction mode of the current target block according to the comparison result of the size of the current target block and a pre-determined value (S1050, S1060).

The intra prediction mode of the current target block may be decoded using the intra prediction mode coding method determined in steps S1030, S1050 or S1060 (S1070).

The intra prediction mode coding method may include at least one of an MPM list construction method, an MPM mode coding method according to whether the intra prediction mode of the current target block is an MPM, or a remaining mode coding method.

The meaning of the different intra prediction mode coding methods refers to, for example, a case that the number of available intra prediction modes are different, a case that the number of MPM modes that can be included in the MPM list is different, and/or a case that coding methods of the remaining modes are different.

Figure 11:
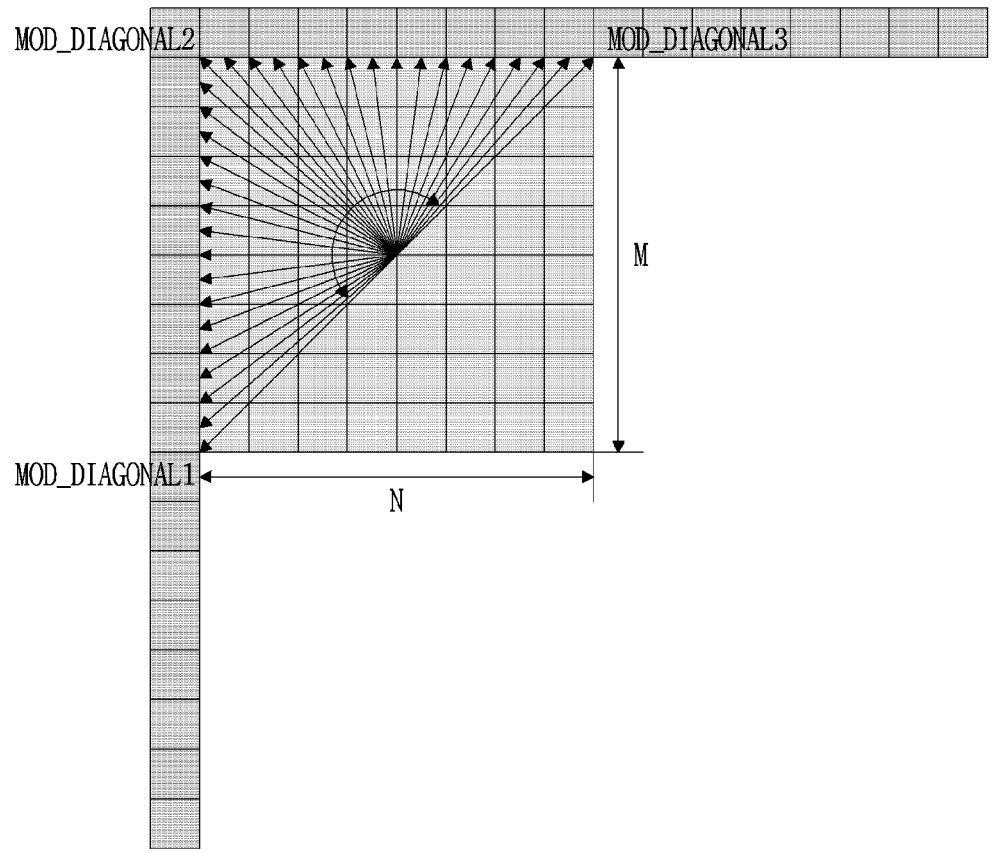
FIGS. 11 and 12 are diagrams for explaining an embodiment of using different number of intra prediction modes according to the size or shape of the current target block.
Figure 12:
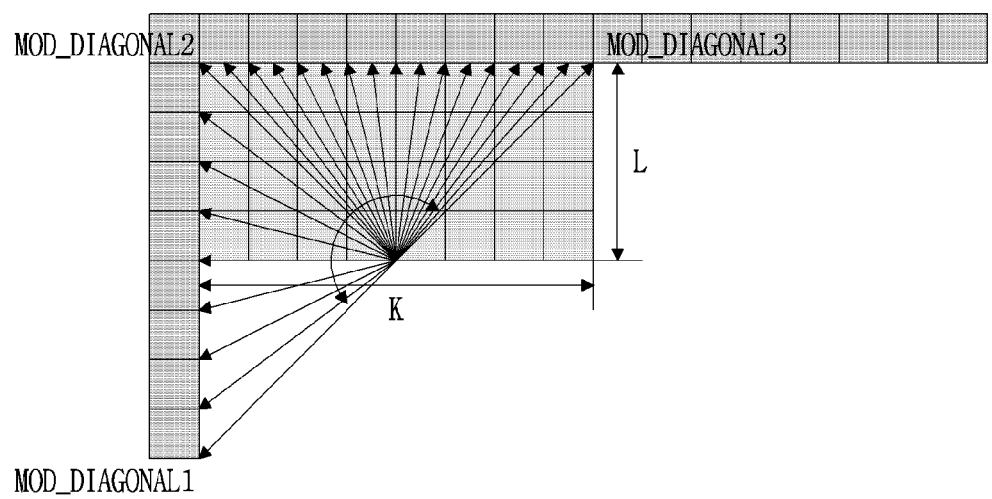

FIGS. 11 and 12 are diagrams for explaining an embodiment of using different number of intra prediction modes according to the size or shape of the current target block.

The number of intra prediction modes may be changed according to the size of the current target block. In addition, the number of intra prediction modes with the vertical directionality and the number of intra prediction modes with the horizontal directionality may be changed according to the shape of the current target block (e.g., a split type).

The block of N×M size illustrated in FIG. 11 will be referred to as block A below, and the block of K×L size illustrated in FIG. 12 will be referred to as block B below.

When the size of block A is larger than the size of block B, the total number of intra prediction modes that can be applied to block A may be greater than the total number of intra prediction modes that can be applied to block B. The size of the block and the number of applicable intra prediction modes corresponding thereto may be preset in the encoder and decoder. Alternatively, it may be transmitted, through the bitstream, from an encoder to a decoder. Alternatively, it may be derived through a pre-determined calculation process using the size of the block. Alternatively, the encoder and the decoder may store a look-up table for the number of applicable intra prediction modes, it may determine the number of intra prediction modes applicable to the current target block by transmitting only index information for the look-up table to the decoder.

When the shape of the current target block is a non-square rather than a square, the number of modes with horizontal directionality which are available for the current target block and the number of modes with vertical directionality which are available for the current target block may be determined differently from each other.

For example, in the example illustrated in FIG. 12, the current target block is a horizontally long non-square block in which K is greater than L. In this case, the number of modes with the horizontal directionality may be less than the number of modes with the vertical directionality. Here, the modes with the horizontal directionality may mean modes located between MODE_DIAGONAL1 and MODE_DIAGONAL2, and the modes with the vertical directionality may mean modes located between MODE_DIAGONAL2 and MODE_DIAGONAL3. As illustrated in FIG. 12, MODE_DIAGONAL1 means a diagonal mode in the bottom-left direction, MODE_DIAGONAL2 means a diagonal mode in the top-left direction, and MODE_DIAGONAL3 may mean a diagonal mode in the top-right direction. The mode value of the MODE_DIAGONAL may be variably determined based on the total number of directional modes available for the current block. For example, when the number of directional modes available for the current block is 65, MODE_DIAGONAL1, MODE_DIAGONAL2 and MODE_DIAGONAL3 may have mode values of 2, 34 and 66, respectively. Or, when the number of directional modes is 33, MODE_DIAGONAL1, MODE_DIAGONAL2 and MODE_DIAGONAL3 may have mode values of 2, 18 and 34, respectively.

To this end, the number of modes with horizontal directionality may be reduced, or the number of modes with vertical directionality may be increased. The reduction may be implemented by applying the offset mentioned in the embodiment of FIG. 3 to a mode belonging to a pre-determined range (e.g., mode 3 to mode 16). Here, the pre-determined range may be mode 3 to mode 16 (if the number of directional modes is 65) or mode 3 to mode 9 (if the number of directional modes is 33).

Conversely, when the current target block is a vertically long non-square block, the number of modes with horizontal directionality may be greater than the number of modes with vertical directionality. To this end, the number of modes with horizontal directionality may be increased, or the number of modes with vertical directionality may be decreased. Similarly, the reduction may be implemented by applying the offset mentioned in the embodiment of FIG. 3 to a mode belonging to a pre-determined range (e.g., mode 52 to mode 65). Here, the pre-determined range may be mode 52 to mode 65 (if the number of directional modes is 65) or mode 27 to mode 33 (if the number of directional modes is 33).

Exemplary methods of the present disclosure are expressed as a series of operations for clarity of description, but are not intended to limit the order in which the steps are performed, and each step may be performed simultaneously or in a different order if necessary. In order to implement the method according to the present disclosure, the steps illustrated may further include other steps, may include the remaining steps except some steps, or may exclude some steps and include additional other steps.

Various embodiments of the present disclosure are not intended to list all possible combinations, but are intended to describe representative aspects of the present disclosure, and the matters described in various embodiments may be applied independently or in combination of two or more.

In addition, various embodiments of the present disclosure including the plurality units illustrated in FIG. 1 may be implemented by hardware, firmware, software, or a combination thereof. In the case of implementation by hardware, it may be implemented by one or more of Application Specific Integrated Circuits (ASICs), Digital Signal Processors (DSPs), Digital Signal Processing Apparatus (DSPDs), Programmable Logic Apparatus (PLDs), Field Programmable Gate Arrays (FPGAs), general processors, controllers, microcontrollers, microprocessors, and the like.

The scope of the present disclosure includes software or machine-executable instructions (e.g., operating systems, applications, firmware, programs, etc.) that cause an operation according to various embodiment methods to be executed on a apparatus or computer, and such software or Instructions include a non-transitory computer-readable medium that is stored and executable on a apparatus or computer.

INDUSTRIAL APPLICABILITY

The present invention may be used in a method and apparatus for encoding/decoding an image.

The invention claimed is:

1. A method of decoding an image, comprising:
obtaining, from a bitstream, first split information indicating whether to split a current coding block into a plurality of sub-blocks;
obtaining, from the bitstream, second split information indicating a split direction of the current coding block when the first split information indicates that the current coding block is split into the plurality of the sub-blocks, wherein the split direction is determined as one of a horizontal direction or a vertical direction;
determining, based on the first split information and the second split information, a split type of the current coding block;
splitting, based on the split type and a number of the plurality of the sub-blocks, the current coding block into the plurality of the sub-blocks;
deriving an intra prediction mode of the current coding block; and
performing intra prediction on each of the sub-blocks belonging to the current coding block based on the intra prediction mode of the current coding block,
wherein the intra prediction is sequentially performed on the each of the sub-blocks in a predetermined coding order by using the intra prediction mode of the current coding block, wherein the number of the plurality of the sub-blocks is variably derived by a decoding apparatus using a width and a height of the current coding block, wherein the number of the plurality of the sub-blocks is determined as one of a plurality of candidate numbers pre-defined at the decoding apparatus, wherein the candidate numbers include at least one of 2, 4, 8 or 16, wherein, in response to a case where one of the width or the height of the current coding block is equal to 4 and the other one of the width or the height of the current coding block is equal to 8, the number of the plurality of the sub-blocks is determined as 2, wherein, in response to a case where both the width and the height of the current coding block are greater than or equal to 8, the number of the plurality of the sub-blocks is determined as 4, wherein deriving the intra prediction mode comprises, generating a most probable mode (MPM) list of the current coding block using intra prediction modes of neighboring blocks of the current coding block; and determining the intra prediction mode of the current coding block from the MPM list, wherein the neighboring blocks include a left block and a top block of the current coding block, and wherein a position of the left block is determined based on the height of the current coding block and a position of the top block is determined based on the width of the current coding block.

2. The method of claim 1, wherein the intra prediction mode is derived from an intra prediction mode set, and wherein the intra prediction mode set includes 2 non-directional modes and 65 directional modes.

3. The method of claim 1, wherein the MPM list includes 5 MPMs.

4. The method of claim 3, wherein the neighboring blocks includes a left neighboring block and a top neighboring block, wherein when there is a plurality of blocks adjacent to a left of the current coding block, a bottom-most block among the plurality of blocks is determined as the left neighboring block, and wherein when there is a plurality of blocks adjacent to a top of the current coding block, a right-most block among the plurality of blocks is determined as the top neighboring block.

5. The method of claim 1, wherein the left block is determined as a block including (xCb−1, yCb+cbHeight−1), and the top block is determined as a block including (xCb+cbWidth—1, yCb−1), and wherein (xCb, yCb) indicates a top-left position of the current coding block, and cbHeight and cbWidth indicate the height and width of the current coding block, respectively.

6. A method of encoding an image, comprising:

determining a split type of a current coding block;

splitting, based on the split type and a number of the plurality of the sub-blocks, the current coding block into a plurality of sub-blocks; and determining an intra prediction mode of the current coding block; and performing intra prediction on each of the sub-blocks belonging to the current coding block based on the intra prediction mode of the current coding block, wherein the intra prediction is sequentially performed on the each of the sub-blocks in a predetermined coding order by using the intra prediction mode of the current coding block, wherein first split information indicating whether to split the current coding block into the plurality of the sub-blocks is encoded into a bitstream, wherein second split information indicating a split direction of the current coding block is encoded into the bitstream when it is determined that the current coding block is split into the plurality of the sub-blocks, wherein the split direction is determined as one of a horizontal direction or a vertical direction, wherein the number of the plurality of the sub-blocks is variably derived by an encoding apparatus using a width and a height of the current coding block, wherein the number of the plurality of the sub-blocks is determined as one of a plurality of candidate numbers pre-defined at the encoding apparatus, wherein the candidate numbers include at least one of 2, 4, 8 or 16, wherein, in response to a case where one of the width or the height of the current coding block is equal to 4 and the other one of the width or the height of the current coding block is equal to 8, the number of the plurality of the sub-blocks is determined as 2, and wherein, in response to a case where both the width and the height of the current coding block are greater than or equal to 8, the number of the plurality of the sub-blocks is determined as 4, wherein determining the intra prediction mode comprises, generating a most probable mode (MPM) list of the current coding block using intra prediction modes of neighboring blocks of the current coding block; and determining the intra prediction mode of the current coding block from the MPM list, wherein the neighboring blocks include a left block and a top block of the current coding block, and wherein a position of the left block is determined based on the height of the current coding block and a position of the top block is determined based on the width of the current coding block.

7. A non-transitory computer-readable medium for storing a bitstream generated by an image encoding method, the image encoding method comprising:

determining a split type of a current coding block;

splitting, based on the split type and a number of the plurality of the sub-blocks, the current coding block into a plurality of sub-blocks; and determining an intra prediction mode of the current coding block; and performing intra prediction on each of the sub-blocks belonging to the current coding block based on the intra prediction mode of the current coding block, wherein the intra prediction is sequentially performed on the each of the sub-blocks in a predetermined coding order by using the intra prediction mode of the current coding block, wherein first split information indicating whether to split the current coding block into the plurality of the sub-blocks is encoded into the bitstream, wherein second split information indicating a split direction of the current coding block is encoded into the bitstream when it is determined that the current coding block is split into the plurality of the sub-blocks, wherein the split direction is determined as one of a horizontal direction or a vertical direction, wherein the number of the plurality of the sub-blocks is variably derived by an encoding apparatus using a width and a height of the current coding block, wherein the number of the plurality of the sub-blocks is determined as one of a plurality of candidate numbers pre-defined at the encoding apparatus, wherein the candidate numbers include at least one of 2, 4, 8 or 16, wherein, in response to a case where one of the width or the height of the current coding block is equal to 4 and the other one of the width or the height of the current coding block is equal to 8, the number of the plurality of the sub-blocks is determined as 2, and wherein, in response to a case where both the width and the height of the current coding block are greater than or equal to 8, the number of the plurality of the sub-blocks is determined as 4, wherein determining the intra prediction mode comprises, generating a most probable mode (MPM) list of the current coding block using intra prediction modes of neighboring blocks of the current coding block; and determining the intra prediction mode of the current coding block from the MPM list, wherein the neighboring blocks include a left block and a top block of the current coding block, and wherein a position of the left block is determined based on the height of the current coding block, and a position of the top block is determined based on the width of the current coding block.

\* \* \* \* \*